Patented Nov. 14, 1944

2,362,508

UNITED STATES PATENT OFFICE 2,362,508

THERAPEUTIC SUBSTANCES

Joseph R. Stevens, Plainfield, and Ralph H. Beutel, Newark, N. J., assignors to Merck & Co., Inc., Rahway, N. J., a corporation of New Jersey No Drawing. Application December 6, 1940,
Serial No. 368,844

4 Claims. (Cl. 260—479)

This invention relates to substances having a physostigmine-like action, intermediates and processes for their production.

*Physostigmine*

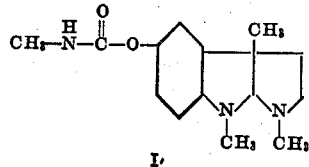

I.

is a drug which is capable of stimulating the para sympathetic nervous system. It has been used in the treatment of atony of the intestine in post operative distention, for decreasing the intraocular pressure in glaucoma and for strengthening the paretic muscles in myasthenia gravis. However, physostigmine is subject to certain serious disadvantages, among them being that some of its actions are quite severe and at times rather unpredictable. Also the compound is relatively unstable so that care must be exercised in its use and preparation for use in order to avoid decomposition. For these reasons considerable effort has been expended in an attempt to find compounds having an action similar to physostigmine but not having its marked disadvantages.

Stedman (Biochemical Journal, vol. 20, 1926, p. 720) in the course of study found that compounds of the types

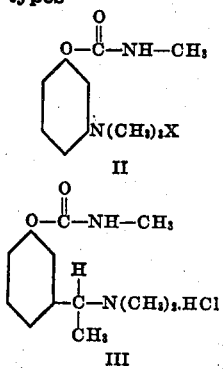

possessed physostigmine-like properties but that the corresponding ortho and para series showed only slight activity. Later Aeschlimann [Journal of Pharmacology and Experimental Therapeutics, 43:413 (1931) and U. S. Patent No. 1,905,990] investigated a further series of such compounds and showed that the dimethyl carbamic acid esters of phenol also possessed activity and were much more stable.

We have now found that nuclear alkyl groups substituted in the phenyl radical affect very markedly the therapeutic activity of mono- or di-alkyl, or mono- or di-aryl carbamic acid esters of amino phenols. This is true whether the amino group is ortho, meta, or para to the carbamic acid group and is also true regardless of the position of the nuclear alkyl group with respect to the amino group and the carbamic acid group. Particularly active are carbamic acid esters of p-amino phenols, in which alkyl groups are substituted in ortho position to the amino or carbamic acid group, or ortho to both the amino and carbamic acid groups. For example, the dimethyl-carbamic acid ester of 3-isopropyl-4-dimethylamino phenol methiodide is 1600 times more active, therapeutically, than the corresponding carbamic acid esters of amino phenols in which alkyl groups are not substituted in the phenolic ring.

The new compounds of our invention have the following general formula

in which R is a nuclearly alkylated phenyl radical containing a dialkylamino group, $R_1$ is alkyl or an aryl radical of the benzene series, and $R_2$ is hydrogen, alkyl or an aryl radical of the benzene series.

According to our invention, these series of compounds may be prepared by coupling the desired alkyl-phenol with phenyl diazonium chloride, followed by reduction to produce an alkyl-amino phenol. This is methylated to form the corresponding dimethyl-amino-phenol from which the dimethyl carbamic acid ester is prepared by treatment of the phenol with dialkyl carbamyl halide in dry pyridine. The base can then be converted to a salt, for example, the hydrochloride, methiodide or methylsulfate by treatment with hydrogen chloride, methyl iodide, methyl sulfate and similar reagents.

Phenols which contain one or more alkyl groups such as carvacrol, thymol, cresol, and the like, may also be treated according to this process, for the preparation of carbamic acid esters of their amino derivatives. They may also be prepared by reacting the selected phenol with nitrous acid and reducing the thus obtained nitroso phenol to the amino phenol, which is then treated as described above for the production of the carbamic acid ester.

In the examples given below preferred methods for the preparation of our new compounds are given.

It is to be understood that these examples are given by way of illustration and not of limitation, and that variations may be made therein without departing from the scope of the invention and the spirit of the appended claims. Thus, for example, while the invention is illustrated in terms of dimethylamino phenols it will be obvious that other dialkylamino phenols may be prepared by the processes outlined, and by selecting the appropriate alkylating agent in the treatment of the alkylated amino-phenol. Also, the invention is specifically exemplified in terms of dimethyl carbamic acid esters. However, it should be obvious that carbamic acid esters substituted by other alkyl radicals and by aryl radicals of the benzene series may be prepared similarly, by selection of an appropriately substituted carbamyl halide for use in the reaction.

EXAMPLE I

M-ETHYL P-AMINOPHENOL

Forty g. of aniline are dissolved in a mixture of 104 g. concentrated hydrochloric acid and 250 ml. water and diazotized with 30 g. sodium nitrite in 150 ml. water. The diazotized aniline is added to 53.7 g. m-ethyl phenol in 1000 ml. of 6% sodium hydroxide at 0–5° with vigorous stirring and the mixture is allowed to stand ½ hour. After filtering off the insoluble material, the filtrate is acidified with sulfuric acid and extracted with ether. The extract is dried over sodium sulfate and the ether distilled off. The oily residue is taken up in methanol and reduced catalytically in the presence of palladium oxide. After filtering, the methanol is distilled off until crystallization begin to take place. The concentrate is cooled in ice, filtered and washed with ether; yield, 44.5 g., 75% theory; recrystallized from ethanol, M. P. 169.5° C.

M-ETHYL P-DIMETHYL AMINOPHENOL

Eighteen g. of m-ethyl p-aminophenol are dissolved in 500 ml. ethanol, and 20 g. of anhydrous sodium carbonate and 80 g. of methyl iodide are added. The mixture is refluxed for about 12 hours. The hot solution is filtered free from excess sodium carbonate and concentrated until crystallization commences. The concentrate is cooled in ice, filtered, washed with a mixture of equal parts of ether and alcohol, and finally with ether. The quaternary salt thus obtained is destructively distilled under a pressure of 10–20 mm. in an oil bath at 220–250° C. The distillate is taken up in 10% sodium hydroxide, extracted with ether to remove alkali-insoluble products, acidified with sulfuric acid and neutralized with sodium bicarbonate. The product is extracted with ether, and the extract is dried over sodium sulfate and concentrated; yield 6.5 g., 30% theory.

The yield could be increased considerably at this point by refluxing the alkali-insoluble material with 57% hydriodic acid for several hours and working up as usual. In some cases, as much as 50% of the yield is in the form of the methoxy compound.

DIMETHYL CARBAMIC ACID ESTER OF M-ETHYL P-DIMETHYLAMINO PHENOL HYDROCHLORIDE

Six and one-half g. of m-ethyl p-dimethylamino phenol are dissolved in 15 ml. dry pyridine and 5 g. dimethyl carbamyl chloride are added. The mixture is heated overnight on the steam bath, cooled and taken up in ether and water. Sodium hydroxide is added until the water layer is neutral and a further 100 ml. of 2% sodium hydroxide solution is added. The mixture is separated and the ether extract is washed several times with water. The extract is dried and distilled at 14 mm. to remove most of the pyridine. The oily residue is transferred to a Washburn molecular still and distilled in the vacuum of a mercury vapor pump at 110°; yield, 7.5 g., 81% theory.

The thick pale yellow oil is dissolved in anhydrous ether and saturated with dry hydrogen chloride. The resulting crystals are filtered off and washed with ether. They are recrystallized from a minimum amount of absolute alcohol by the slow addition of anhydrous ether. The crystals are washed with ether and dried in vacuo at 76°; yield, 7.8 g., M. P. 141–3°. Recrystallization gives 7 g., M. P. 144.0–4.5°.

DIMETHYL CARBAMIC ACID ESTER OF M-ETHYL P-DIMETHYLAMINO PHENOL METHIODIDE

Five gm. of the dimethylcarbamic acid ester of m-ethyl p-dimethylamino phenol hydrochloride is dissolved in water, made alkaline with ammonia and extracted with ether. The extract is dried and concentrated and the residue is taken up in a small amount of acetone. An excess of methyl iodide is added and, after three days, several volumes of ether are added. The mixture is filtered and washed with ether, yielding 3.6 g. of the methiodide, M. P. 148–9°. On evaporating down the mother liquors, taking the residue up in methyl iodide and standing for 10 days, a further 2.8 g. are obtained; yield, 6.4 g., 97% theory. Recrystallization from alcohol and ether gives 6.2 g., M. P. 148.5–9.5°.

Using the method outlined above a number of other compounds were prepared. These new compounds are listed in Table I, and for convenience in comparing the activity of our new compounds with that of the dimethyl carbamic acid ester of p-dimethylamino phenol, and with physostigmine, itself, these two last mentioned substances are also listed in Table I.

*Table I*

| Compound. Dimethyl carbamic acid ester of— | | Analysis | | | | | M. P. | L. D. 50 in mice mgm./kilo |
|---|---|---|---|---|---|---|---|---|
| | | C | H | N | Cl | I | | |
| | | | | | | | Degrees | |
| m-Methyl-p-dimethylamino phenol hydrochloride. | Calc | 64.8 | 8.17 | | | | } | 105 |
| | Found | 65.3 | 8.15 | | | | | |
| m-Methyl-p-dimethylamino phenol methiodide | Calc | | | 7.69 | | | } 169 | 13.0 |
| | Found | | | 7.40 | | | | |
| m-Ethyl-p-dimethylamino phenol hydrochloride | Calc | | | | 13.0 | | } 144–144.5 | 45.0 |
| | Found | | | | 12.8 | | | |
| m-Ethyl-p-dimethylamino phenol methiodide | Calc | | | | | 33.6 | } 149.5 | 1.15 |
| | Found | | | | | 33.9 | | |
| m-Isopropyl-p-dimethylamino phenol methiodide | Calc | | | 7.14 | | | } 163–4 | 0.075 |
| | Found | | | 6.72 | | | | |
| p-Dimethylamino phenol methiodide | Calc | | | 8.00 | | | } 195.5–196 | 120 |
| | Found | | | 7.97 | | | | |
| Physostigmine methiodide | Calc | | | | | | } 188 | 0.75–1.0 |
| | Found | | | | | | | |

Certain new compounds have been prepared as intermediates in the production of the compounds listed in Table I. These new intermediates are given in Table II.

Table II

| Compound | Analysis | | M. P. |
|---|---|---|---|
| | Calc. | Found | |
| 3-ethyl-4-aminophenol | | | Degrees |
| N | 10.2 | 10.4 | 169.5 |
| 3-ethyl-4-dimethylaminophenol. HCl | | | |
| Cl | 17.6 | 17.6 | 179–180 |
| 3-isopropyl-4-aminophenol | | | |
| N | 9.27 | 9.56 | 175.5 |
| 3-isopropyl-4-dimethylaminophenol. HCl | | | |
| Cl | 16.4 | 16.8 | 218–19 |

EXAMPLE II

NITROSO CARVACROL

One hundred gms. of carvacrol are dissolved in 100 cc. absolute ethanol, saturated with hydrogen chloride at 10°. Fifty-six gms. of sodium nitrite in concentrated aqueous solution are slowly added at 10° with vigorous stirring. The thick paste is diluted with several volumes of water and allowed to stand over night. This is filtered, washed with water and dried. Yield, 118 gms.

P-AMINO CARVACROL

The nitroso carvacrol is dissolved in 2 l. of methanol and reduced with hydrogen in the presence of 1 gm. platinum oxide under about 1 atm. pressure. The catalyst is filtered off and the filtrate distilled down on the steam bath to the start of crystallization. Several volumes of hot water are added, the mixture cooled in ice, filtered, the product washed with water and dried. Yield 100 g.

P-DIMETHYLAMINO CARVACROL

The p-amino carvacrol is dissolved in 1 l. methanol and refluxed for 7 hours with 75 gms. of anhydrous sodium carbonate and 454 gms. methyl iodide. After standing overnight the mixture is cooled in ice, filtered, washed with isopropanol, then ether, and dried.

The impure quaternary salt is distilled directly under vacuum at about 250–75°. The distillate is taken up in benzene, filtered from any quaternary salt carried over, extracted with 10% NaOH and the alkaline solution acidified. Upon the addition of ammonium hydroxide the p-dimethylamino carvacrol crystallizes out. Filtered, washed with water and dried. Yield, 40 gms. p-dimethylamino carvacrol.

If the alkali-insoluble material is refluxed with hydriodic acid and worked up in the usual manner, the yield can be greatly increased at this point. This is due to the methylation of the hydroxy group in the methylation step.

DIMETHYL CARBAMIC ACID ESTER OF P-DIMETHYLAMINO CARVACROL HYDROCHLORIDE

Forty gms. of p-dimethylamino carvacrol, 28 gms. of dimethyl carbamyl chloride, and 90 cc. dry pyridine are heated on the steam bath overnight with vigorous stirring. As much of the pyridine as possible is distilled off at 1 mm. and the residue is taken up in ether and 2% sodium hydroxide. The ether extract is washed several times with 2% sodium hydroxide, dried and concentrated in vacuo. The crystalline residue is dissolved in ether and converted to the hydrochloride by passing dry hydrogen chloride into the ether solution. Filtered, washed with ether and dried. M. P. 185°.

DIMETHYL CARBAMIC ACID ESTER OF P-DIMETHYLAMINO CARVACROL METHIODIDE

The dimethyl urethane of p-dimethylamino carvacrol hydrochloride is dissolved in water, made alkaline with ammonia and extracted with ether. The ether extract is dried and concentrated in vacuo. An excess of methyl iodide is added to the residue and the mixture allowed to stand several days; filtered, recrystallized from methanol-ether, from ethanol and finally from $CH_3OH$—$Et_2O$. Yield, 40 gms.; M. P., 172.5°.

EXAMPLE III

Thymol is treated according to the above procedure to produce the dimethyl carbamic acid ester of p-dimethylamino thymol hydrochloride and methiodide.

New compounds prepared are listed in Tables III and IV.

Table III

| Compound. Dimethyl carbamic acid ester of— | Analysis | | M. P. | L. D. 50 in mice mgm./kg. |
|---|---|---|---|---|
| | Calc. | Found | | |
| p-Dimethylamino thymol methiodide | | | Degrees | |
| N | 6.89 | 6.89 | 171.5 | 0.72 |
| p-Dimethylamino carvacrol methiodide | | | 173.5 | 0.24 |
| N | 6.89 | 6.97 | | |
| p-Dimethylamino thymol dimethyl urethane hydrochloride | | | | |
| N | 9.32 | 9.26 | 170 | 160 |
| p-Dimethylamino carvacrol dimethyl urethane hydrochloride | | | | |
| N | 9.32 | 9.29 | 185.5 | 20 |

Table IV

| Compound | Analysis | | M. P. |
|---|---|---|---|
| | Calc. | Found | |
| p-Dimethylamino thymol hydrochloride | | | Degrees 203–4 |
| N | 6.10 | 6.21 | |
| p-Dimethylamino carvacrol hydrochloride | | | |
| N | 6.10 | 6.22 | 216–216.5 |

EXAMPLE IV

O-AMINO P-CRESOL

Forty-four gms. of p-cresol are dissolved in a solution of 35 gms. sodium hydroxide in 1000 cc. water. At 10° C. a solution of phenyl diazonium chloride prepared from 40 gms. aniline, 104 gms. 30% hydrochloric acid, 850 cc. water and 30 gms. sodium nitrite is added. The mixture is allowed to stand for about 12 hours, filtered, washed with water and recrystallized from ethanol. Yield, 78 gms.

The product is dissolved in methanol and reduced with hydrogen using platinum oxide as a catalyst. The catalyst is filtered off and the filtrate distilled down to a small volume. The product is filtered off, washed with petroleum ether and dried. Yield, 30 gms.; M. P. 132°.

O-DIMETHYLAMINO P-CRESOL

Twenty-eight gms. of o-amino p-cresol are dissolved in 110 cc. methanol and 130 gms. methyl iodide and 30 gms. anhydrous sodium carbonate added. After the reaction subsides, it is refluxed for about three hours. The mixture is cooled, filtered, and the product washed with ether and dried. Yield, 46 gms.

Thirty gms. of the quaternary salt are distilled at 10 mm. in a bath at 250°. This gives 10.4 gms. of impure material which is taken up in ether and extracted with 10% sodium hydroxide. The alkaline extract is acidified with acetic acid, neutralized with sodium bicarbonate, extracted with ether, and the ether extract dried, and concentrated. Yield, 5.3 gms.

Additional material may be obtained by refluxing the alkali insoluble portion with hydriodic acid and working up in the usual way.

DIMETHYLCARBAMIC ACID ESTER OF O-DIMETHYLAMINO P-CRESOL HYDROCHLORIDE

Three gms. of o-dimethylamino p-cresol are dissolved in 6 gms. pyridine and 2.78 gms. dimethyl carbamyl chloride added. After heating on the steam-bath overnight the excess pyridine is distilled off in vacuo and the residue distilled in a molecular still at 110° at $10^{-4}$ mm. The distillate is taken up in ether and converted to the hydrochloride by passing in dry hydrogen chloride. The product is filtered off, washed with ether, and dried. Yield, 2.34 gms.

DIMETHYLCARBAMIC ACID ESTER OF O-DIMETHYLAMINO P-CRESOL METHIODIDE

The hydrochloride is dissolved in water, made alkaline with ammonia and extracted with ether. Concentrated, added an excess of methyl iodide to the residue and let stand for about twelve hours. The crystalline mass is triturated with ether, filtered, washed with ether, dried; recrystallized twice from EtOH—Et$_2$O.

The new compounds listed in Table VI are prepared according to this process.

Table VI

| Compound. Dimethyl carbamic acid ester of— | Analysis | | M. P. | L. D. 50 in mice mgm./kg. |
|---|---|---|---|---|
| | Calc. | Found | | |
| o-Dimethylamino p-methyl phenol methiodide | | | 154.5 | 2 |
| C | 42.8 | 43.2 | | |
| H | 5.81 | 5.51 | | |
| o-Dimethylamino p-ethyl phenol methiodide | | | 148–9 | 1.25 |
| I | 33.6 | 33.4 | | |
| o-Dimethylamino p-isopropyl phenol methiodide | | | 171 | 4.8 |
| C | 45.9 | 46.3 | | |
| H | 6.42 | 6.35 | | |
| o-Dimethylamino p-tertiary butyl phenol methiodide | | | 162 | 13.5 |
| I | 31.2 | 31.2 | | |
| o-Dimethylamino p-tertiary amyl phenol methiodide | | | 146.5 | 12.0 |
| I | 30.2 | 30.1 | | |
| o-Dimethylamino p-methyl phenol hydrochloride | | | 174.5 | 200 |
| C | 55.7 | 55.4 | | |
| H | 7.41 | 7.13 | | |
| o-Dimethylamino p-ethyl phenol hydrochloride | | | 144–5 | 27 |
| Cl | 13.0 | 13.1 | | |
| o-Dimethylamino p-isopropyl phenol hydrochloride | | | 168.5 | >400 |
| Cl | 12.4 | 12.4 | | |
| o-Dimethylamino p-tertiary butyl phenol hydrochloride | | | 186.5 | >500 |
| Cl | 11.8 | 11.8 | | |
| o-Dimethylamino p-tertiary amyl phenol hydrochloride | | | 175.5–176.5 | >500 |
| Cl | 11.3 | 11.3 | | |

During the course of this work the new compounds listed in Table VII were prepared.

Table VII

| Compound | Analysis | | M. P. |
|---|---|---|---|
| | Calc. | Found | |
| p-Ethyl-o-aminophenol | | | 139.5 |
| N | 10.2 | 9.87 | |
| p-Ethyl o-dimethylamino phenol hydrochloride | | | 157 |
| Cl | 17.6 | 17.6 | |
| p-Isopropyl o-amino phenol | | | 136 |
| N | 9.27 | 9.10 | |
| p-Isopropyl o-dimethylamino phenol hydrochloride | | | 172 |
| Cl | 16.4 | 16.7 | |
| p-Tertiary butyl o-amino phenol | | | 161.5 |
| N | 8.48 | 8.32 | |
| p-Tertiary butyl o-dimethylamino phenol hydrochloride | | | 217–218 |
| N | 6.23 | 5.99 | |
| p-Tertiary amyl o-amino phenol | | | 120 |
| N | 7.82 | 7.67 | |
| p-Tertiary amyl o-dimethylamino phenol | | | 44–45 |
| N | 6.76 | 6.71 | |

The p-isopropyl phenol for the p-isopropyl derivative was prepared as follows:

P-ISOPROPYL ANILINE

A mixture of 100 gms. of nitric acid (d. 1.44) and 150 gms. concentrated sulfuric acid is added slowly with stirring at 20–30° to 100 gms. cumene. When all of the acid is added, the cooling bath is removed and the temperature allowed to rise to 40°. When there is no further rise in temperature, the mixture is poured onto ice, diluted with water and extracted with ether. The extract is washed with sodium bicarbonate solution and dried. The ether is distilled off and the residue taken up in methanol and reduced with hydrogen, using platinum oxide catalyst. The alcohol is distilled off, the residue dissolved in ether and extracted with hydrochloric acid. The acid extract is made alkaline with sodium hydroxide and extracted with ether. The ether is distilled off and the residue added to a boiling solution of 100 gms. oxalic acid in 1 l. water. The solution is decolorized with charcoal, filtered hot and cooled in ice to 10°. The product is filtered off and recrystallized from 1000 cc. boiling water. The oxalate is suspended in water, an excess of potassium hydroxide solution added, extracted with benzene, dried and the benzene distilled off. Yield, 34 gms.

On working up the mother liquors of the oxalate salt of the amine an additional 22 gms. p-isopropyl aniline, somewhat less pure, are obtained.

P-ISOPROPYL PHENOL

Thirty-four gms. of p-isopropyl aniline are suspended in 62.5 gms. conc. sulfuric acid and 500 cc. water. 17.3 gms. of sodium nitrite in 175 cc. water are added at 0° C. The excess nitrous acid is destroyed with urea and the mixture heated at 50–60° for several hours. The solution is cooled, extracted with benzene, the benzene solution extracted with 10% sodium hydroxide, the alkaline solution acidified and extracted with benzene. Upon distilling off the benzene, the residue crystallizes immediately on cooling. Distillation at atmospheric pressure gave 25 gms. of p-isopropyl phenol.

EXAMPLE V

P-AMINO O-CRESOL

Sixty-eight gms. of o-cresol are dissolved in 270 cc. 10% sodium hydroxide and to this is added a solution of a diozotized aniline from 60 gms. aniline in 132 cc. conc. hydrochloric acid and 200 cc. water and 240 cc. 20% sodium nitrite at 0°. The material is filtered, acidified with acetic acid, the dye filtered off and dried. The filtrate is dissolved in hot benzene, petroleum ether is added, cooled, filtered, dried. Yield, 43.5 gms.; M. P. 129°.

The yield is dissolved in methanol and reduced with hydrogen, using platinum oxide catalyst. The catalyst is filtered off, the filtrate concentrated, cooled in ice, filtered, washed with petroleum ether, dried. Yield, 14 gms. p-amino o-cresol; M. P. 173°.

P-DIMETHYLAMINO O-CRESOL

The product is dissolved in 150 cc. methanol and refluxed for about twelve hours with 65 gms. methyl iodide and 15 gms. sodium carbonate; cooled in ice, filtered, washed with ether.

The quaternary salt is distilled at 10 mm. in a bath at 250°. The distillate is dissolved in ether and extracted with 10% sodium hydroxide. This is acidified and then neutralized with sodium bicarbonate; extracted with ether, dried, concentrated. A further yield may be obtained by refluxing the alkali-insoluble portion with hydriodic acid and working up as usual.

DIMETHYL CARBAMIC ACID ESTER OF P-DIMETHYL-AMINO O-CRESOL HYDROCHLORIDE

Three gms. of the base are dissolved in 6 gms. pyridine and 2.78 gms. dimethyl carbamyl chloride added. The mixture is heated for about twelve hours on the steam bath, after which the excess pyridine is distilled off in vacuo. The residue is taken up in ether, washed several times with 2% NaOH and concentrated.

The concentrate is distilled at 110° in a molecular still at $10^{-4}$ mm. The distillate is dissolved in ether and hydrogen chloride passed in. It is filtered and recrystallized from EtOH—Et$_2$O. The dimethyl carbamic acid ester of p-dimethylamino o-cresol hydrochloride of melting point 189° is obtained.

Calc.: C, 55.7%; H, 7.41%; found: C, 55.5%; H, 7.74%.

DIMETHYL CARBAMIC ACID ESTER OF P-DIMETHYL-AMINO O-CRESOL METHIODIDE

The hydrochloride is dissolved in water, made alkaline with ammonia and extracted with ether. The extract is concentrated, and an excess of methyl iodide added and the mixture allowed to stand for about 12 hours. Ether is added, and the material is filtered, and the filtrate recrystallized twice from EtOH—Et$_2$O. The dimethyl carbamic acid ester of p-dimethyl-amino o-cresol methiodide of melting point 189–190° is obtained.

Calc.: C, 42.8%; H, 5.81%    50% L. D. 6.5 mgm./kgm.
Found: C, 43.0%; H, 5.99%

We claim:

1. The dimethyl carbamic acid ester of p-dimethyl-amino thymol methiodide.
2. The dimethyl carbamic acid ester of p-dimethyl-amino,m-isopropyl phenol methiodide.
3. The dimethyl carbamic acid ester of p-dimethylamino carvacrol methiodide.
4. A substance selected from the class consisting of compounds of the formula

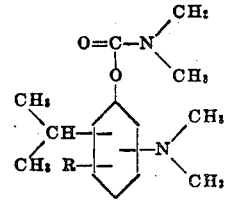

where R is one of the group CH$_3$ and hydrogen, and quaternary salts thereof.

JOSEPH R. STEVENS.
RALPH H. BEUTEL.